July 20, 1943.  A. BENZICK ET AL  2,324,902
SEAT CONSTRUCTION
Filed March 28, 1940  2 Sheets-Sheet 2
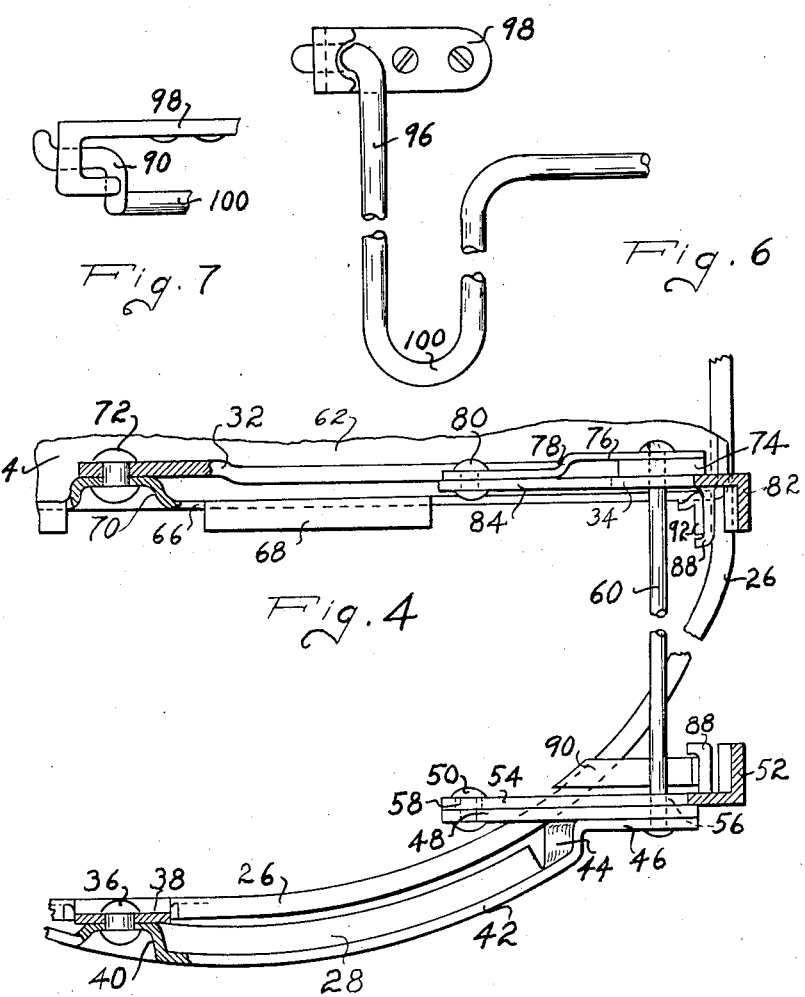
INVENTORS.
ALEXANDER BENZICK
HERMAN C. RUSCH.
BY Carl J. Barbee
ATTORNEY.

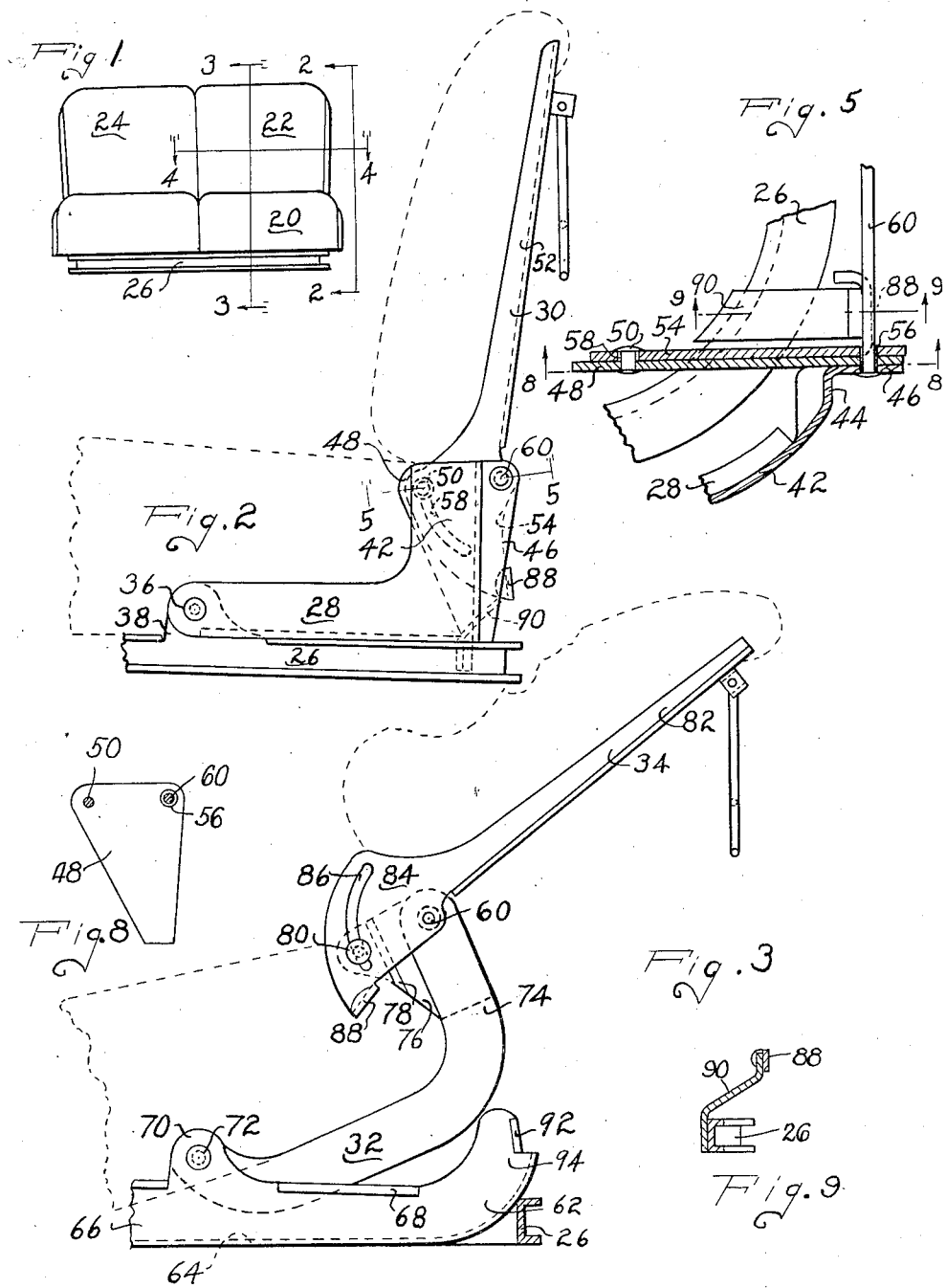

Patented July 20, 1943

2,324,902

UNITED STATES PATENT OFFICE 2,324,902

SEAT CONSTRUCTION

Alexander Benzick and Herman C. Rusch, Milwaukee, Wis., assignors to Nash-Kelvinator Corporation, Kenosha, Wis., a corporation of Maryland Application March 28, 1940, Serial No. 326,438

3 Claims. (Cl. 155—7)

This invention relates to automobile seat construction and has particular reference to the seat occupied by the driver of an automobile.

It is an object of this invention to provide a driver's seat which may be folded back to form a portion of a bed.

It is another object of this invention to provide a driver's seat for an automobile which may be positively locked in driving position and unlocked to fold the seat backward to form a portion of a bed.

It is another object of this invention to provide a driver's seat of an automobile which may be tipped forward to provide entrance space as in a two door four passenger automobile and at the same time is arranged to be tipped backwardly to form a portion of a bed.

Other objects and advantages of this invention will be apparent from a consideration of the following specification and the attached drawings of which there are two sheets and in which Figure 1 represents a front elevation of the front seat of an automobile;

Figure 2 represents an end elevation of the seat illustrated in Figure 1 with the upholstery removed;

Figure 3 represents a section taken along the line 3—3 of Figure 1 with the upholstery removed and showing the framework in rotated position;

Figure 4 represents a broken section taken along the line 4—4 of Figure 1 with the upholstery removed;

Figure 5 represents a section taken along the line 5—5 of Figure 2 and looking in the direction of the arrows;

Figure 6 represents a partial rear elevation of a robe rail for use in connection with our invention;

Figure 7 represents a plan view of the robe rail shown in Figure 6;

Figure 8 represents a sectional view taken along a plane indicated by the line 8—8 in Figure 5 and looking in the direction of the arrows; and Figure 9 represents a sectional view taken along a plane indicated by the line 9—9 in Figure 5 and looking in the direction of the arrows.

The driver's seat illustrated is arranged to be combined with and to cooperate with a right hand or passenger seat such as is described and claimed in our copending application, Serial No. 307,737, filed December 6, 1939, which became Patent No. 2,286,784 on June 16, 1942. We have provided in this invention and our copending application mentioned above a front seat construction for an automobile which is readily adjustable to form a bed within an automobile. This construction is highly desirable particularly to campers and persons making long trips who do not desire to spend the time or money to stop at hotels.

Illustrated in Figure 1 is a front seat of an automobile having a cushion 20, the left hand or driver's seat back portion 22, and a right hand or passenger seat back portion 24. The entire seat is supported upon a base member 26 which may be fastened directly to the floor of the automobile or may form a portion of a sliding carriage for moving the entire seat backward and forward within the automobile as is commonly done in present day cars. We have shown the base member 26 to be a frame, channel shaped in cross section, which conforms generally to the outline of the seat.

The main frame portions of our seat construction, which provide the following characteristics of the seat and support the springs and upholstery, consist of a lower side hinge leaf 28 and an upper hinge leaf 30 on the left hand side of the seat, and a lower hinge leaf 32 and an upper hinge leaf 34 on the right hand side of the seat.

The connections of the various members on the left hand side of the seat are illustrated most clearly in Figures 2, 4 and 5 and are as follows: The lower hinge leaf 28 is fastened to the base member 26 by means of a pivot pin 36. We have shown the connection to be made to a lug 38 which is formed by bending a portion of the top flange of the channel member 26 to a vertical position. The lower hinge leaf 28 is angle shaped in cross section and curved to conform to the outline of the seat cushion. The point for connecting the lower hinge leaf with the pivot 36 is provided by deforming the vertical side of the angle member as is shown most clearly at 40 in Figure 4. Towards its rear end the lower hinge leaf 28 is provided with an upstanding portion 42 which is bent in along the back of the seat at 44 and then bent backwardly to form the vertical plate 46. Attached to the inner surface of the plate 46 by suitable means such as welding is the generally triangularly shaped plate 48. The widest portion of the plate 48 extends forwardly of the plate 46 and is provided with a fixed pin 50 at its upper front corner for a purpose which will be described later. The upper hinge leaf 30 on the left hand side of the seat is provided with a flanged back member 52 and a segment shaped plate 54 at the lower end of the back portion 52. The segment shaped portion 54 is provided at its upper rear portion with a hole 56 and an arcuate slot 58 which is formed on a radius around the hole 56. The upper rear portion of the plates 46 and 48 are drilled to receive a shaft 60 which passes through these plates and through the hole 56 in the upper hinge leaf. The pin 50 in the plate 48 is arranged to slide in the slot 58 in the upper hinge leaf. It is thus seen that the upper hinge leaf 30 may rotate about the shaft 60 in a vertical plane within the limits defined by the slot 58. The slot 58 is formed through an arc of approximately 90°. This allows the back portion of the seat to be lowered to a horizontal position or raised to a vertical driving position.

The right hand side of the driver's seat is supported as follows: In the center of the front seat 20 I have provided a channel member the left side of which is shown at 62 and which is supported upon the main base member 26. The member 62 may form a part of the general base structure of the seat or may be fastened thereon after the base has been constructed. The channel 62 has a bottom flange 64 and side vertical flanges one of which is shown at 66 from the top of which is bent out the horizontal strengthening flange 68. A portion of the horizontal flange 68 is bent up at 70 to form a lug to which the lower hinge leaf 32 is fastened by means of the pivot pin 72. The lower hinge leaf 32 is arranged to rest on the horizontal surface 64 of the base 62 when the seat is in normal position. The lower hinge leaf 32 is bent up at 74 and the plate 76 is fastened to the top of the bent up portion by suitable means such as welding. The plate 76 extends forwardly of the bent up portion 74 and is bent in towards the center of the seat at 78 and continued along the plane of the lower hinge member 32. The forward portion of the plate 78 is provided with pin 80 which performs the same function as the pin 50 on the left hand side of the seat. The upper rear portion 74 of the lower hinge member and the plate 76 are drilled to receive the right hand end of the shaft 60.

The right hand upper hinge leaf 34 is just the reverse of the left hand upper hinge leaf, having a back portion 82 and a lower segment shaped portion 84 in which is cut the arcuate groove 86 on a radius about the point where the shaft 60 passes through the upper hinge leaf.

In order to maintain the back portion 22 of the seat in a vertical position when it is desired to have the seat function as a driving seat, we have provided the inturned lugs 88 at the lower end of each upper hinge leaf. The lug 88 on the left hand hinge leaf is arranged to engage the back of a bracket 90 fastened to the base member 26. The lug 88 on the right hand hinge leaf is arranged to engage the back of lug 92 formed on the upstanding portion 94 of the channel member 62. Thus when the lower hinge leaves 28 and 32 are held in their lowered position as they will be when the driver is seated in the driving seat, the lugs 88 on the upper hinge leaves are engaged behind the fixed portions of the base as just described, and it is impossible for any amount of pressure on the back cushion and upper hinge leaves to swing the back cushion 22 in a backward direction. When it is desired to lower the back cushion 22, it is only necessary to raise the entire seat including the lower hinge members 28 and 32 until the lugs 88 have cleared the bracket 90 and the lug 92 on the base. At this time the back cushion and the upper hinge leaves 30 and 34 may be rotated about the shaft 60, and the lower hinge leaves may be allowed to return to their normal position.

We wish to point out that in the structure just described, the entire driver's seat may be tipped forward about the pivots 36 and 72 to make room for persons to enter the back seat of a two door automobile. When the pins 50 and 80 have reached the upper end of the slots 58 and 86, there can be no further forward rotation of the upper hinge leaves relative to the lower hinge leaves. Therefore, any force supplied to the back cushion 22 will raise the entire seat as just described.

When the seat back cushion 22 is folded into its horizontal position, its back edge will be supported from the floor of the automobile by means of the robe rail 96 which is pivoted in the brackets 98, screwed to the back of the back cushion 22. The robe rail 96 may be bent down at each end as at 100 to form legs for supporting the back cushion at the proper level.

The structure just described functions as the main supporting frame for the seat. The springs and upholstery may be made up in any ordinary manner known to the upholsterer's art today and fitted to the structure here disclosed. The seat cushion may rest on the base and the lower hinge leaves while the back cushion will be fastened to the upper hinge leaves. If desired, the upper hinge leaves may be made directly as a part of the seat back cushion.

While we have described our invention in some detail, we intend this description to be an example only and not limiting our invention to which we make the following claims.

We claim:

1. An automobile seat construction comprising a base member having a lug thereon, a lower hinge leaf arranged to conform to a portion of the outline of said seat and pivoted at its forward end to said lug, a plane portion carried at the rear of said lower hinge leaf and normal to the axis of said lower hinge leaf, an upper hinge leaf pivoted to the plane portion of said lower hinge leaf, a plate portion on said upper hinge leaf defining an arcuate slot, a pin carried by said plane portion of said lower hinge leaf and riding in said arcuate slot, a lug carried on the lower end of said upper hinge leaf, and means fastened to said base for engaging the lug on said upper hinge leaf when said lower hinge leaf is in position for said seat to be occupied.

2. Seat construction comprising a base member, a lower hinge leaf arranged to conform to a portion of the outline of said seat and pivoted at its forward end to said base member and arranged to rest thereon when in normal position, a seat cushion supported on said lower hinge leaf, a plane portion carried at the rear of said lower hinge leaf and normal to the axis of said pivot, an upper hinge leaf pivoted on the plane portion of said lower hinge leaf, a plate portion formed on said upper hinge leaf and positioned against said plane portion of said lower hinge leaf, means connecting said plane portion of said lower hinge leaf and said plate portion of said upper hinge leaf comprising a pin slidable in a slot for limiting the arc through which said upper hinge leaf will rotate with respect to said lower hinge leaf, a fixed abutment on said base, a flange on said upper hinge engageable with said abutment when said upper hinge is at the forward limit of its rotation and when said lower hinge is resting on said base.

3. Seat construction comprising a base having a flange, a portion of said flange bent up to form a lug, a lower hinge leaf, a pivot passed through said lug and the front end of said lower hinge leaf, an upper hinge leaf, a second pivot joining said upper hinge leaf to the rear of said lower hinge leaf, said upper hinge leaf having a lower segment shaped portion with a flange thereon and defining an arcuate slot, means on said lower hinge leaf engageable with said arcuate slot for limiting the rotation of said upper hinge leaf about said second pivot and means on said base engageable with the flange on said upper hinge leaf when said upper hinge leaf is at one limit of its rotation about said second pivot for preventing rotation of said upper hinge leaf about said second mentioned pivot, said last mentioned means being rendered inoperative by rotating said lower hinge leaf forward about said first mentioned pivot.

ALEXANDER BENZICK.
HERMAN C. RUSCH.